(12) United States Patent
Lawson et al.

(10) Patent No.: US 7,864,064 B2
(45) Date of Patent: Jan. 4, 2011

(54) FUGITIVE EMISSIONS DETECTION DEVICES

(75) Inventors: Rick A. Lawson, Houston, TX (US); Michael S. Kelly, Spring, TX (US)

(73) Assignee: Fugitive Emissions Detection Device, Inc., Spring, TX (US)

( * ) Notice: Subject to any disclaimer, the term of this patent is extended or adjusted under 35 U.S.C. 154(b) by 0 days.

(21) Appl. No.: 12/350,691

(22) Filed: Jan. 8, 2009

(65) Prior Publication Data
US 2009/0115602 A1    May 7, 2009

Related U.S. Application Data

(63) Continuation of application No. 10/736,324, filed on Dec. 15, 2003, now abandoned, which is a continuation of application No. 10/369,926, filed on Feb. 18, 2003, now Pat. No. 6,722,185, which is a continuation of application No. 09/536,486, filed on Mar. 27, 2000, now Pat. No. 6,530,259, which is a continuation of application No. 09/199,234, filed on Nov. 24, 1998, now Pat. No. 6,041,645, which is a continuation-in-part of application No. 08/836,927, filed as application No. PCT/US95/15064 on Aug. 13, 1996, now Pat. No. 5,979,227, and a continuation-in-part of application No. 08/341,419, filed on Nov. 14, 1994, now Pat. No. 5,610,324, which is a continuation-in-part of application No. 08/148,997, filed on Nov. 8, 1993, now abandoned.

(51) Int. Cl.
*G08B 21/00* (2006.01)
*G01M 3/04* (2006.01)

(52) U.S. Cl. .................. 340/604; 340/605; 340/612; 340/618; 340/626; 340/632; 340/539.1; 340/539.2; 340/539.22; 340/636.1; 73/40; 73/40.5 R

(58) Field of Classification Search ............... None
See application file for complete search history.

(56) References Cited

U.S. PATENT DOCUMENTS

| | | | |
|---|---|---|---|
| 1,559,461 A | 10/1925 | Ruben | |
| 2,460,215 A | 1/1949 | Chase | 99/192 |
| 2,817,230 A | 12/1957 | McCully | 73/46 |
| 2,766,614 A | 10/1959 | Cook | 73/46 |
| 2,954,797 A | 10/1960 | Dryer | 137/312 |
| 3,045,198 A | 7/1962 | Dolan et al. | 338/13 |
| 3,247,478 A | 4/1966 | Craig | 338/35 |
| 3,485,085 A | 12/1969 | Hawkins | 73/46 |
| 3,507,145 A | 4/1970 | Loh | 73/23 |

(Continued)

FOREIGN PATENT DOCUMENTS

JP    63289434    11/1988

*Primary Examiner*—Julie Lieu
(74) *Attorney, Agent, or Firm*—King & Spalding L.L.P.

(57) ABSTRACT

The present invention relates to detection and alarm systems for predicting and detecting the location of spills, leaks, emissions, and/or pollution sources, i.e., unwanted fluid (liquid/gas) flow/escape, at refineries, e.g., oil and gas refineries, and plants, e.g., petrochemical, chemical, pharmaceutical, and food processing plants, and avoiding said unwanted flow/escape. According to one embodiment, said system comprises at least one detector, at least one battery powered radio frequency transmitter, preferably, according to one embodiment, a 900 megahertz spread spectrum transmitter, and a central processing location which, according to one embodiment, is preferably capable of handling up to 3000 points in a single cell site.

23 Claims, 11 Drawing Sheets

U.S. PATENT DOCUMENTS

| | | | |
|---|---|---|---|
| 3,767,519 A | 10/1973 | Kojima et al. | 161/168 |
| 3,879,985 A | 4/1975 | Maslen | 73/27 |
| 4,019,371 A | 4/1977 | Chaplin et al. | 73/46 |
| 4,107,724 A | 8/1978 | Ralph | 357/30 |
| 4,123,836 A | 11/1978 | Buckell | 29/156.4 |
| 4,129,030 A | 12/1978 | Dolan | 73/23 |
| 4,160,246 A | 7/1979 | Martin et al. | 340/630 |
| 4,194,389 A | 3/1980 | Laging | 73/46 |
| 4,195,288 A | 3/1980 | Morton | 340/539 |
| 4,213,180 A | 7/1980 | Marchak et al. | 364/431 |
| 4,224,595 A | 9/1980 | Dolan | 338/34 |
| 4,232,736 A | 11/1980 | Pillette | 166/53 |
| 4,237,721 A | 12/1980 | Dolan | 73/23 |
| 4,282,743 A | 8/1981 | Pickett | 73/46 |
| 4,295,669 A | 10/1981 | LaPrade et al. | 285/47 |
| 4,458,521 A | 7/1984 | Pillette | 73/46 |
| 4,466,273 A | 8/1984 | Pillette | 73/46 |
| 4,507,954 A | 4/1985 | Boutwell | 73/40.7 |
| 4,557,139 A | 12/1985 | Cantwell et al. | 73/40.7 |
| 4,601,194 A | 7/1986 | Miller et al. | 73/40.7 |
| 4,674,320 A | 6/1987 | Hirschfeld | 73/23 |
| 4,696,191 A | 9/1987 | Claytor et al. | 73/600 |
| 4,723,441 A | 2/1988 | Sweeney | 73/40.5 |
| 4,727,749 A | 3/1988 | Miller et al. | 73/46 |
| 4,827,246 A | 5/1989 | Dolan et al. | 340/521 |
| 4,851,303 A | 7/1989 | Madou et al. | 429/13 |
| 4,864,847 A | 9/1989 | Anderson et al. | 73/40.7 |
| 4,876,884 A | 10/1989 | Jansch | 73/49.1 |
| 4,926,680 A | 5/1990 | Hasha et al. | 73/46 |
| 4,963,293 A | 10/1990 | Burack et al. | 252/626 |
| 5,039,561 A | 8/1991 | Debe | 427/255.6 |
| 5,170,659 A | 12/1992 | Kemp | 73/46 |
| 5,209,105 A | 5/1993 | Hasha et al. | 73/49.1 |
| 5,259,404 A | 11/1993 | Case et al. | 131/365 |
| 5,272,997 A | 12/1993 | van der Lely et al. | 119/14.08 |
| 5,287,384 A | 2/1994 | Avery et al. | 375/1 |
| 5,299,264 A | 3/1994 | Schotz et al. | 381/14 |
| 5,330,720 A | 7/1994 | Sorbo et al. | 422/98 |
| 5,348,044 A | 9/1994 | Eugene et al. | 137/312 |
| 5,385,297 A | 1/1995 | Rein et al. | 236/49.3 |
| 5,387,462 A | 2/1995 | Debe | 428/245 |
| 5,390,206 A | 2/1995 | Rein et al. | 375/1 |
| 5,505,718 A | 4/1996 | Roe et al. | 604/368 |
| 5,506,864 A | 4/1996 | Schilling | 375/205 |
| 5,568,121 A | 10/1996 | Lamensdorf | 340/539 |
| 5,610,324 A | 3/1997 | Lawson | 73/46 |
| 5,654,246 A | 8/1997 | Newkirk et al. | 501/80 |
| 5,676,712 A | 10/1997 | Anderson | 48/192 |
| 5,774,052 A | 6/1998 | Hamm et al. | 340/540 |
| 5,798,945 A | 8/1998 | Benda | 364/550 |
| 5,948,271 A * | 9/1999 | Wardwell et al. | 210/739 |
| 5,950,150 A | 9/1999 | Lloyd et al. | 702/183 |
| 5,979,227 A | 11/1999 | Lawson et al. | 73/46 |
| 6,041,645 A | 3/2000 | Lawson et al. | 73/46 |

\* cited by examiner

FUGITIVE EMISSIONS DETECTION DEVICES

CROSS REFERENCE TO RELATED APPLICATION

This application is a continuation of U.S. patent application Ser. No. 10/736,324 filed Dec. 15, 2003; now abandoned which is a continuation of U.S. patent application Ser. No. 10/369,926 filed on Feb. 18, 2003, now U.S. Pat. No. 6,722,185; which is a continuation of U.S. patent application Ser. No. 09/536,486 filed on Mar. 27, 2000, now U.S. Pat. No. 6,530,259; which is a continuation application of U.S. Ser. No. 09/199,234 filed on Nov. 24, 1998, now U.S. Pat. No. 6,041,645; which is a continuation of U.S. Ser. No. 08/836,927 filed on Aug. 13, 1996, now U.S. Pat. No. 5,979,227; which is a national application of PCT/US95/15064 filed on Nov. 17, 1995, and a continuation-in-part application of application Ser. No. 08/341,419 filed on Nov. 17, 1994, now U.S. Pat. No. 5,610,324; which is a continuation-in-part application of Ser. No. 08/148,997 filed on Nov. 8, 1993, abandoned.

FIELD OF THE INVENTION

The present invention is directed to the containment and detection of fugitive emissions, for example, leaking from valves and bolted flange connections. Also, the present invention is directed to a system for detecting and monitoring emissions. In another embodiment, the present invention relates to enclosures for valves and pipe connections or joints. In another aspect, the present invention relates to novel detectors for the detection of fugitive emissions.

BACKGROUND OF THE INVENTION

One of the major environmental concerns is the amount of polluting emissions which are leaked directly into the atmosphere due to the failure of present systems. The existing systems are expensive and technically inadequate. It is believed that the two primary sources responsible for over 95% of industrial fugitive emissions are valve stuffing boxes and bolted pipe flange connections used in the oil and gas, and petrochemical industries.

One example of the present state of the art in detection systems includes equipment which monitors large areas; such equipment detects leaks only after the emissions have entered the atmosphere. Another detection system requires an individual to use small, hand-held units in order to detect leaks. This method is unreliable, especially if detection takes place in the presence of even a small cross wind. Both methods allow leakage to continue for significant periods of time before detection and correction can occur. The ever stricter standards set by environmental agencies has led to the need for a more effective and efficient monitoring system for fugitive emissions. The present invention provides a solution to eliminate 95% of the fugitive emissions.

SUMMARY OF THE INVENTION

The present invention is directed to a monitoring system which detects fugitive emissions, for example, those leaking from valves and bolted flange connections in the oil and gas, and petrochemical industries. The invention is also directed to systems applicable in the chemical, pharmaceutical and the food processing industries. The system of the present invention may be comprised of a set of enclosures, a set of detectors for the enclosures, a set of signalers in communication with the detectors, and, if desired, a central processing location for monitoring the status of the enclosed sites.

The present invention is also directed to novel enclosures for pipe flange connections and valve stuffing boxes as used in the oil and gas, and petrochemical industries. The pipe flange connection enclosures are comprised of members, preferably two semi-circle shaped members, which when combined encompass the flange connection. The members form a centrally located internal channel. On either side of the centrally located channel are walls, preferably of gaskets or seals, such that when the semi-circle members are joined around or encompass a pipe flange connection, the centrally located channel forms an enclosure around the gasket area between the pipe flanges of the connection. The channel of one of the members includes a port for sealably receiving a detector of the present invention. Alternatively, one of the members also includes a port in the channel for receiving a vent plug.

The present invention is also directed to new enclosures for valve stuffing boxes. The valve stuffing box enclosures are preferably comprised of two members or half-pieces preferably shaped when joined like a hollow frustrum, i.e., it is frustro-conical in shape when joined. Each member may include, according to one embodiment, gaskets or seals around the inside top portion, i.e., the narrow end of the frustrum and at the inside bottom portion, i.e., the wider end of the frustrum. In addition, one member of the pair includes lengthwise channels for receiving the other member having lengthwise gaskets or seals.

In a preferred embodiment, the valve stuffing box enclosures of the present invention are comprised of two members or half-pieces (mirrored pieces/halves) that when joined are preferably shaped like a hollow frustrum. Preferably, the enclosures do not include any gaskets or seal-type material around any of the edges of the members. Preferably, each member includes a receiver to receive a side of the other half to form a mechanical connection between the two halves. The receiver of one half and the opposing side of the other half when joined form a mechanical seal such that emissions leaked from the valve stuffing box are reliably detected by the detector in communication with the inside space of the enclosure.

The invention is also directed to valve stuffing box enclosures comprising first and second members (mirror image half-pieces) having an inside and an outside, the outside having preferably, a greater circumference than the inside. Each member includes a receiver on the inside running vertically along an edge of the member, preferably for a majority of the length of said member. The receivers are constructed preferably as folds or pleats integral with the member such that they accept the other member when joined together to form a mechanical seal on the inside of the members sufficient to ensure reliable detection by a detector associated with the enclosure.

The valve stuffing box enclosures are preferably used in conjunction with the pipe flange connection enclosure. The valve stuffing box enclosures are designed to overlap and connect to the pipe flange enclosure forming a heretofore unknown and unrealized combination for the containment and detection of emissions from valve stuffing boxes.

The present invention is also directed to a heretofore unknown adsorption detector. The preferred detector is comprised of a substrate, e.g., metal or ceramic, electrode elements, adsorbent particles, like carbon, of substantially the same size, and an elastomer or a binder type gas permeable material. Preferably, the detector is operated in a non-current saturated mode or in a linear region and can detect substances having a Van der Waals "a" constant of less than about 9. Optionally, if desired, the detector may include non-adsorbent particles. Further, if desired, the detector may include a temperature detector or sensor. In some systems, for example, smaller systems, an indicating cartridge can be used as the detector and signaler. For instance, chemical-treated granules affixed to paper or chemical granules will change color when a threshold emission occurs. The indicator material (or detector/signaler) is enclosed in a housing, like a cylinder, which is installed or connected to the enclosures of the present invention. It is the main object of the present invention to provide a monitoring system to detect emissions before any significant amounts reach the atmosphere which is both convenient and inexpensive to use.

It is another object of the present invention to provide a monitoring system for valve stuffing boxes and pipe flange connections as used in the oil and gas and petrochemical industries.

It is another object of this invention to provide novel enclosures for pipe flange connections and valve stuffing boxes.

It is another object of the present invention to provide novel adsorption detectors for detecting fugitive emissions at heretofore unmeasurable low levels in the field.

DETAILED DESCRIPTION OF THE INVENTION

Figure 1A:
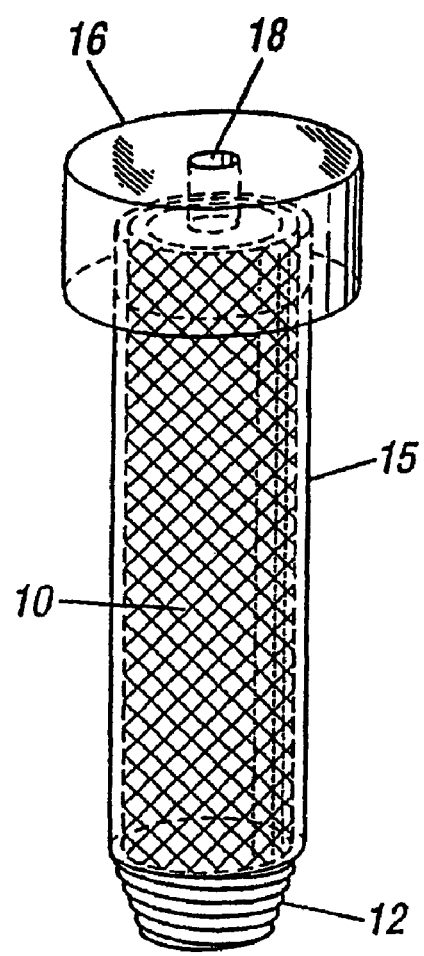
FIG. 1A is a see-through, perspective view of a fugitive emissions detection cylinder.

FIG. IA shows an emissions indicating strip 10 (a detector and signaler) contained within an acrylic or fiberglass cylinder 15. The emissions indicating strip 10 is chemically-treated paper, here shown in the shape of a tube; the paper discloses a color change when emissions react with the chemical present on the surface of the paper (for example, paper treated with litmus will show a color change from red to blue when exposed to ammonia). Similarly, chemically-treated granule detectors/signalers change color upon reaction with emissions, or emissions actuate a gas detector which would trip a relay and activate a light signaler to switch on, also within the acrylic cylinder. The lower portion of the cylinder 15 has threads 12 for insertion into a stuffing box enclosure coupling 30, or into a flange enclosure coupling 40. Cylinder cap 16 seals cylinder 15 and has a one-way cylinder cap vent 18 to relieve any pressure build-up from within the stuffing box enclosure or flange enclosure.

Figure 1B:
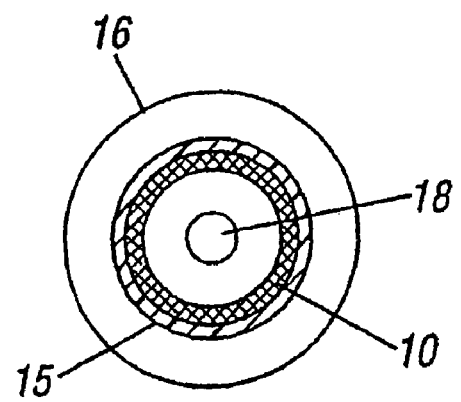
FIG. 1B is a cross-sectional view of the cylinder in FIG. 1A.

FIG. 1B is a cross-sectional view of a cylinder 15, showing emissions indicating strip 10 (detector and signaler) contained within it, as well as the cylinder cap 16 and the cylinder cap vent 18.

Figure 2A:
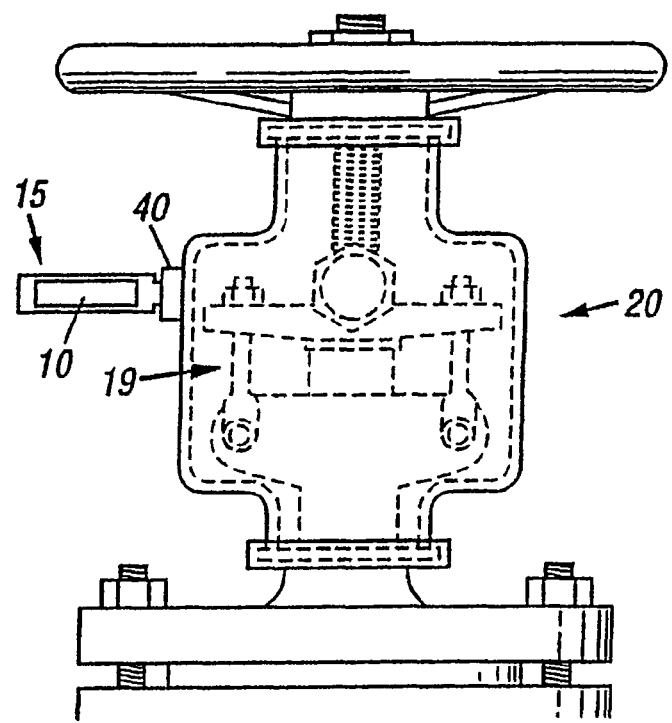
FIG. 2 is a side view of two applications of the invention, one enclosing a valve stuffing box, and one, enclosing a flange.
Figure 2B:
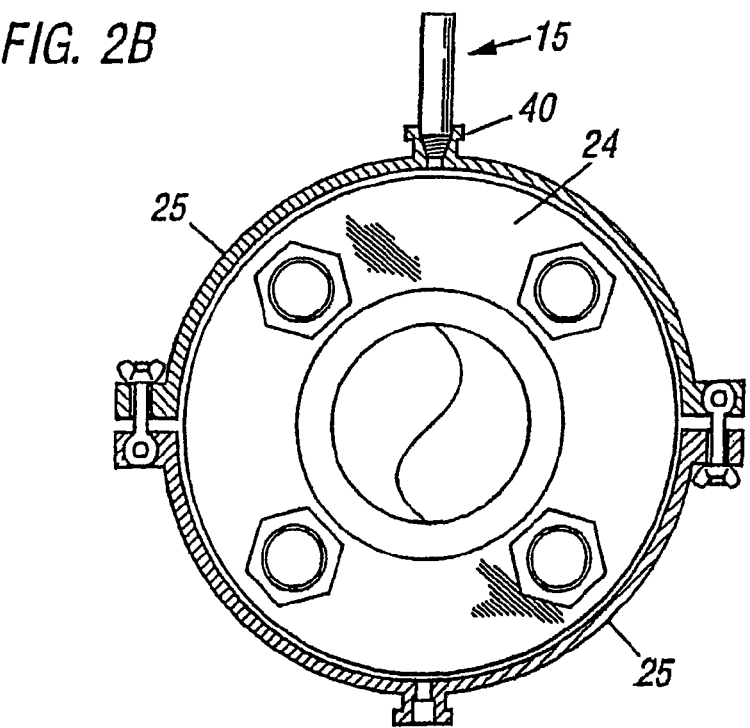

FIG. 2 shows two applications of the invention. The left-hand side of FIG. 2 shows an embodiment of the stuffing box enclosure housing 20 enclosing the valve stuffing box 19. A cylinder 15 containing emissions indicating strip 10 has been inserted into the stuffing box enclosure coupling 20. The right-hand side of the drawing shows the flange enclosure housing 25 enclosing the flange connection 24. A cylinder 15 containing, for example, an emissions indicating strip 10 (not shown) or another detector and signaler (not shown) has been inserted into the flange enclosure coupling 40.

Figure 3A:
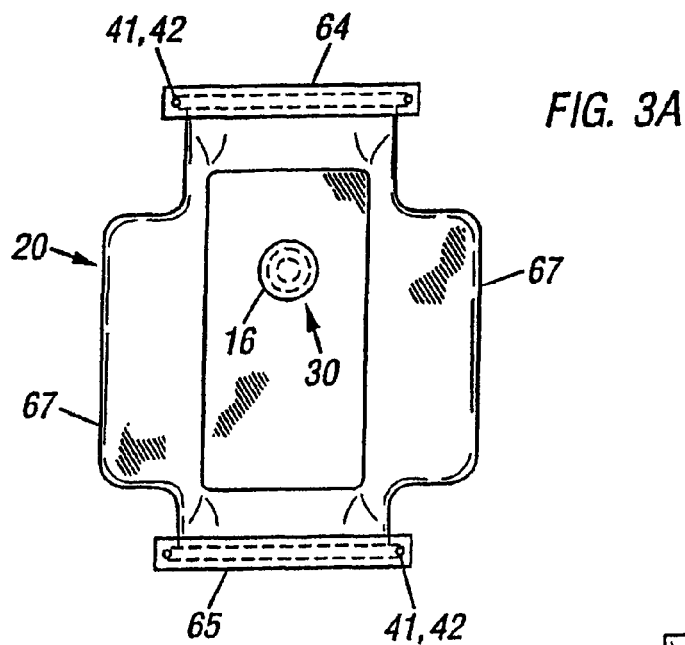
FIG. 3A is a cross-sectional side view of a valve stuffing box enclosure, showing the cap-end of the cylinder in place.
Figure 3B:
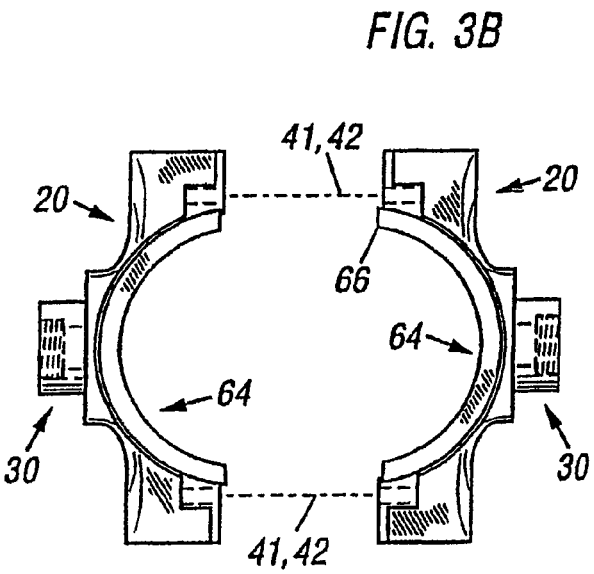
FIG. 3B is the cross-sectional top view of FIG. 3A, of a valve stuffing box enclosure in a disassembled state.
Figure 3C:
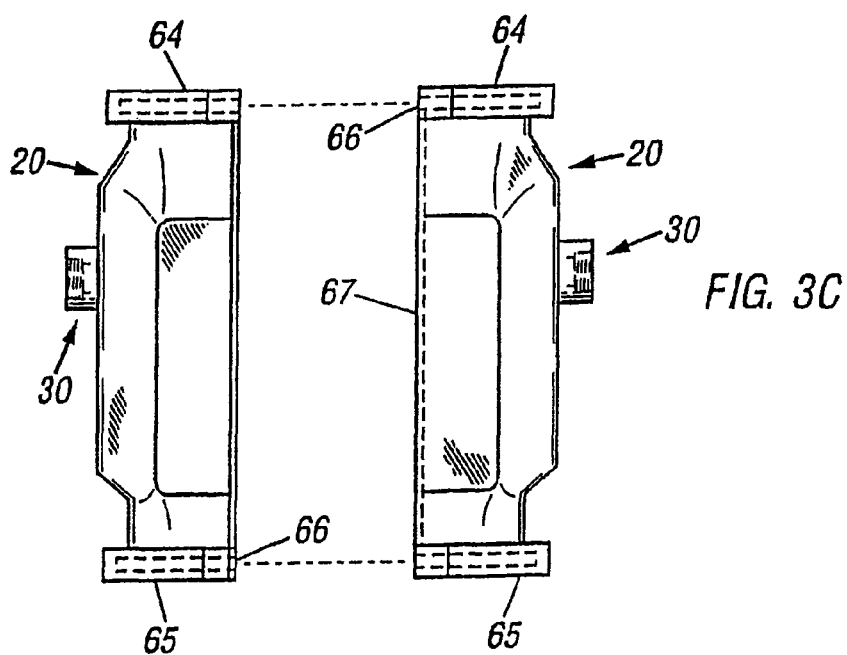
FIG. 3C is a cross-sectional side view (FIG. 3A rotated 90° about a vertical axis) of a valve stuffing box enclosure in a disassembled state.

FIGS. 3A through 3C show views of the two-piece valve stuffing box enclosure, used for detecting emissions from a valve stuffing box. The stuffing box enclosure can be constructed of a material such as Ultem 1000 or aluminum. The two-piece construction allows the enclosure to be easily installed around the top and bottom of a yoke of a valve stuffing box. The seals, which can be made from a material such as silicone, provide a seal to the area around the stuffing box and are designed to prevent outside air from entering the area contained within the stuffing box enclosure and possibly causing the indicating material or detector and signaler to produce a false reading.

FIG. 3A is a cross-sectional side view of one embodiment of a stuffing box enclosure housing 20. Yoke, gasket seal 64 and bonnet gasket seal 65 provide seals between the stuffing box enclosure housing 20 and a valve stuffing box. The seal between the two halves of the stuffing box enclosure housing 20 is created by the stuffing box enclosure gasket seal 67. A screw and nut 41, 42 assembly may be used to bolt together the two halves of the stuffing box enclosure housing 20. The stuffing box enclosure housing coupling 30 has threads to receive the threads 12 of cylinder 15 (not shown).

FIG. 3B is a cross-sectional top view of the two halves of the stuffing box enclosure housing 20 before assembly. Each half has a yoke gasket seal 64, which forms a closed circle upon assembly. The seal is completed with the lip gasket seal 66. The path the screw and nut assembly 41, 42 follows is shown. Threaded stuffing box enclosure couplings 30 are shown on both sides of the stuffing box enclosure housing 20. (The lower yoke gasket seals 65 [not shown] on the lower portion of the stuffing box enclosure housing 20 look exactly like the upper yoke gasket seals 64.)

FIG. 3C is a cross-sectional side view of the stuffing box enclosure housing 20 in two halves (FIG. 3A rotated 90° about a vertical axis), showing the upper yoke gasket seals 64, the lower yoke gasket seals 65, the lip gasket seals 66, and the threaded stuffing box enclosure couplings 30. It also shows the stuffing box enclosure gasket seal 67, which creates the seal between the two halves or members of the stuffing box enclosure housing 20.

FIGS. 4A through 4E show views of the preferred two-piece flange enclosure, used for detecting emissions from a flange. The flange enclosure can be constructed of a material such as aluminum. The two-piece construction allows the enclosure to be easily installed by aligning the two halves or members over the space between the two flanges and securing the two members together. The seals, which can be made from a material such as silicone, together provide an air-tight seal to the area around the flange and are designed to prevent any outside air from entering the area contained within the flange enclosure, and possibly causing the indicating material or detector to produce a false reading.

Figure 4A:
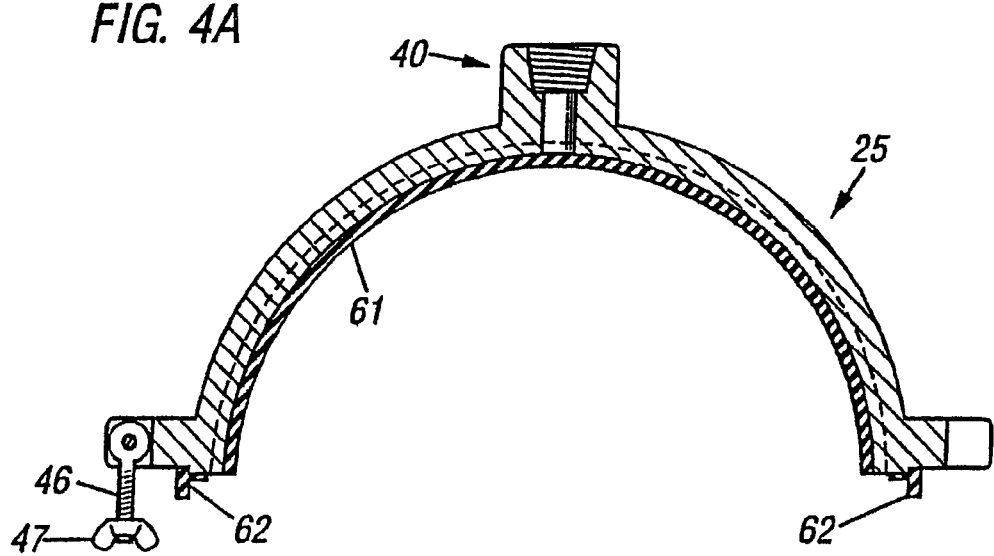
FIG. 4A is a cross-sectional view of one half of a flange enclosure.

FIG. 4A shows a cross-sectional view of one of the halves or members of the flange enclosure housing 25 with threaded flange enclosure coupling 40. One of the flange enclosure gasket seals 61 can be seen running along the inside edge of flange enclosure housing 25. The flange enclosure seals 62 complete the seal when both halves of flange enclosure housing 25 are joined together with the wing and nut assembly 46, 47.

Figure 4B:
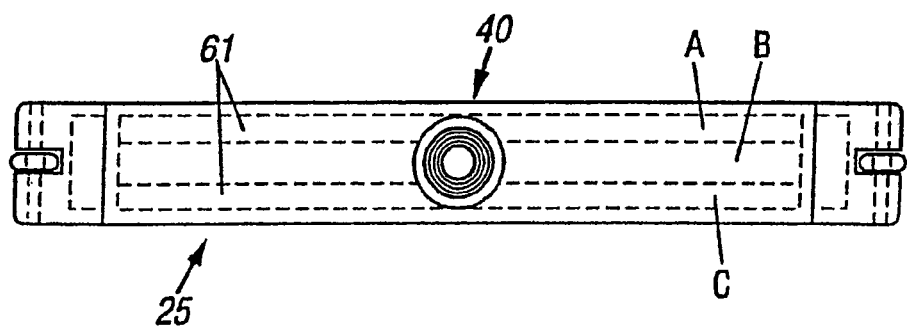
FIG. 4B is a top view of a flange enclosure, showing the threading of the half coupling.

FIG. 4B shows the top of one of the halves of flange enclosure housing 25 with the threaded flange enclosure coupling 40. The dotted lines show the internal channels and the placement of flange enclosure gasket seals 61 and flange enclosure connection seal 62 (on the underside of the flange enclosure housing 25, not shown).

Figure 4C:
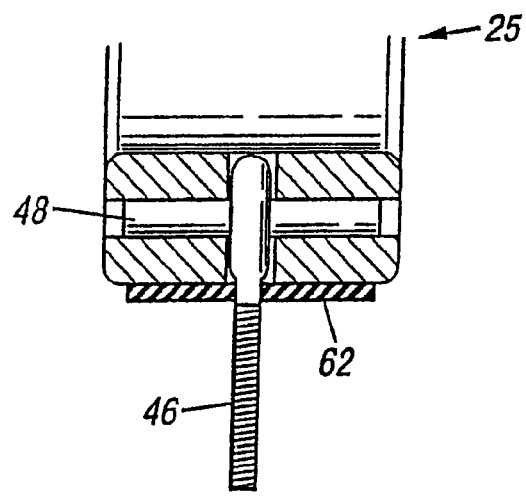
FIG. 4C shows a portion of FIG. 4A, rotated 90° about a horizontal axis.

FIG. 4C illustrates anchor pin 48 inserted into an anchor pin hole, and eyebolt 46, which secure the two halves or members of flange enclosure housing 25 in place around the flange. FIG. 4C also shows the placement of flange enclosure connection seals 62.

Figure 4D:
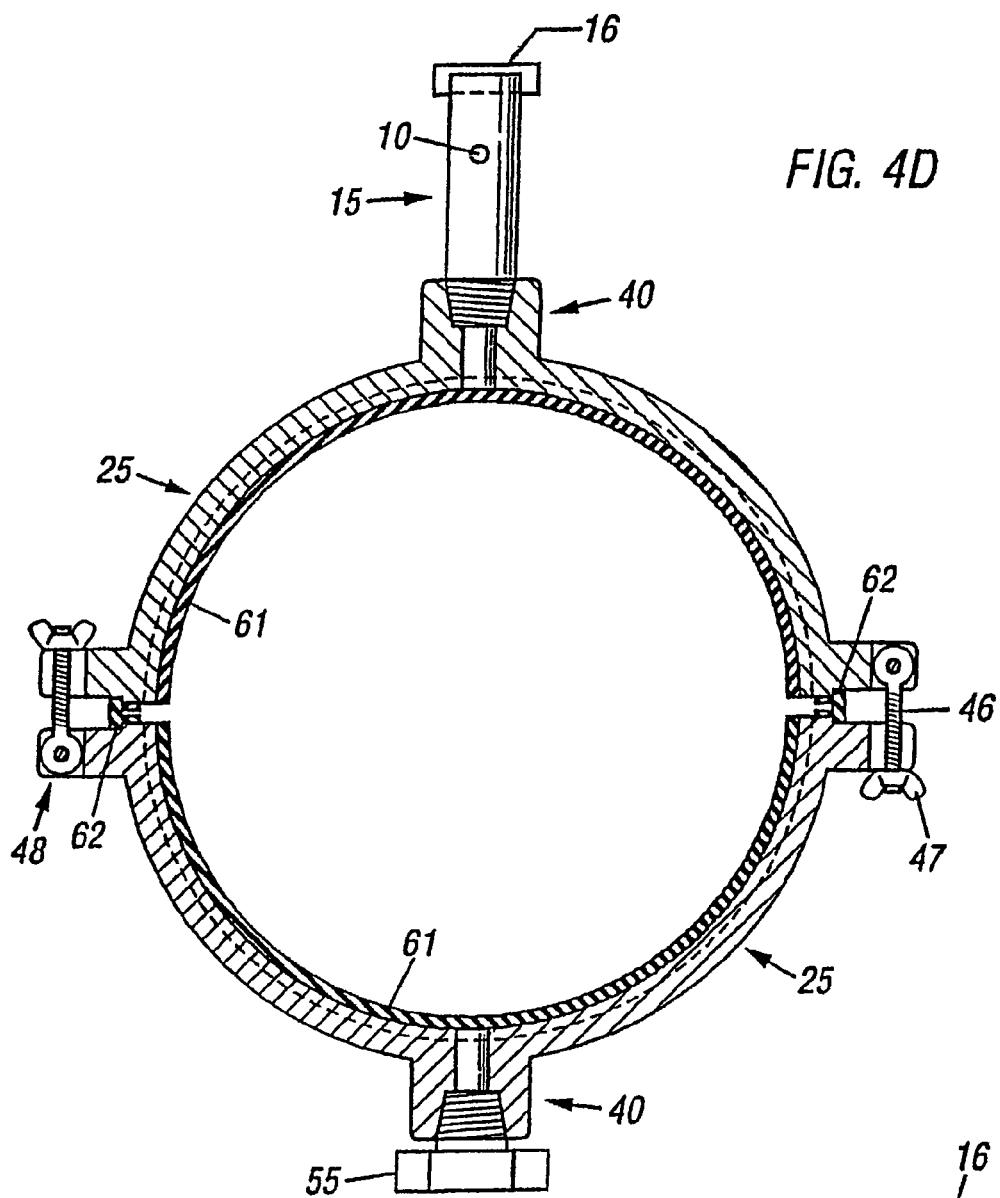
FIG. 4D is a cross-sectional view of a flange enclosure with the cylinder in place.

FIG. 4D shows both halves or members of flange enclosure housing 25 joined together with eyebolt 46, wing nut 47 and anchor pin 48. The flange enclosure gasket seal 61 forms a circle on the inside edge of the flange enclosure housing 25, and flange enclosure connection seals 62 complete the seal. The cylinder 15, containing emission indicating strip 10 (detector/signaler) or an adsorption detector (not shown) and sealed with cylinder cap 16, is shown threaded into one of the flange enclosure couplings 40. A flange coupling plug 55 has been threaded into the other flange enclosure coupling 40.

Figure 4E:
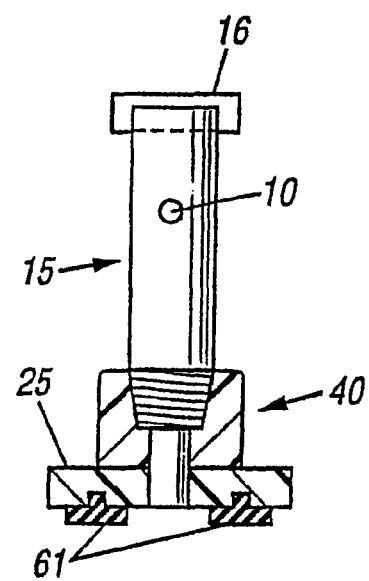
FIG. 4E is a cross-sectional view showing how the cylinder is installed in the half coupling.

FIG. 4E shows a cross-sectional side view of flange enclosure coupling 40 on flange enclosure housing 25. Cylinder 15, containing emission indicating strip 10 (detector/signaler) and sealed with cylinder cap 16, is threaded into flange enclosure coupling 40. The view shows that two flange enclosure gasket seals 61 run along the inside edge of flange enclosure housing 25, one on each outer edge of such housing, creating an enclosure space in a centrally defined channel to contain emissions from the flange, which diffuse into the cylinder 15 and are detected by the emissions indicating strip 40 in communication with the channel.

The present invention is also directed to a system comprised of a set of enclosures, a set of emission detectors for the enclosures, and a set of signalers, like transmitters, for the enclosures. The enclosures of the present invention include enclosures for pipe flange connections and valve stuffing boxes. Referring to FIG. 4D, the pipe flange connection enclosures are preferably comprised of two semi-circle shaped members 25 or halves. The members can be constructed of various metals, like aluminum, or thermoplastics depending on the application. The members may vary in size depending upon the size or circumference of the pipe flange connection to be enclosed. Nevertheless, the members are of such a size such that when they are combined, they encompass the pipe flange connection. Preferably, two members are used but the enclosure can be constructed of more than two members. As known in the art, a customary pipe flange connection includes two pipe flanges bolted together with a gasket positioned between the two flanges. As shown in FIG. 4B, members 25 of the enclosure of the present invention have first (A), second (B) and third (C) internal channels. The first (A) and third (C) channels hold gaskets and are sealed such that when the two members are joined to encompass the pipe flanges, the second (B) channel, That is, the middle channel, forms an enclosure around the gasket area between the two bolted pipe flanges. Referring to FIG. 4D, preferably, one of the members includes port 40 for sealably receiving a detector and/or signaler of the present invention. Alternatively, and preferably, the other member of the pair includes port 40 for receiving a vent plug.

The pipe flange connection enclosure may be secured around the pipe flange connection by any suitable means, e.g., a wing-nut assembly as shown in FIG. 4A or any other type of securing means including straps, buckles, latches, Velcro, adhesives, bolts, screws, hook and loop materials, etc.

It should also be recognized that the pipe flange connection enclosure may also be constructed of a single unitary piece that is adjustable to form the appropriate desired enclosure around the gasket area between the two joined pipe flanges. This unitary construction obviously can be used at the point when the flanges are joined. The preferred embodiments have been described in relation to existing pipe flange connections, however, the same discussion and basic construction applies equally to unitary enclosures.

The enclosure of the present invention for a pipe flange connection may be comprised of: (a) a flange-enclosure assembled from two mirror-image half-clamps or semi-circle members for disposition around or to encompass the circular outer surfaces of two connected flanges, each of the members having a threaded coupling and two extensions located at each end of the members oriented perpendicularly to the outer surface of the members; (b) a resilient seal ring is affixed to the outer edge of the inside diameter of each of the members; (c) another seal ring is affixed to the opposing outer edge of the inside diameter of each of the members such that when the members are disposed around the outer surfaces of the two flanges a seal is created; (d) a resilient gasket seal is affixed to the surface of the extensions of one of the members; (e) means for joining the two members thereby defining an air space between the flanges; (f) a cylindrical indicating cartridge (detector and signaler) with one open end having outer threads and an opposing end sealed with a one-way vent cap, the cartridge is designed to exhibit or signal a change upon exposure of its contents with emissions from between the two the flanges, and the open end of said cartridge being threadably disposed in the coupling of one of the members; and (g) a plug threadably disposed in the coupling of the other.

The pipe flange connection enclosure members 25 may be constructed from extruded aluminum. The extrusion design allows for the acceptance of a standard closed cell foam sheet gasket material which is cut to fit in the grooves or internal channels of the extruded aluminum sheet. The extruded aluminum material is cut to the appropriate lengths and then rolled to whatever diameter that is necessary. The design preferably requires two identical members 25 or halves to enclose the outside diameter of mating flanges, with one gasket fitting on one side and the other gasket fitting on the other side, thus capturing any leak occurring in the gasket area between the mating flanges. Preferably, on each flange enclosure half 25, it will have a half-inch hole 40 drilled in order to accept either a vent plug or a detector or detector/signaler assembly. The method of installation is to put one half of the flange enclosure on the topside of the mating flanges, and fit the other half of the flange enclosure on the bottom. A simple attaching mechanism is utilized to secure and seal the two halves together around the mating flanges and compress the two halves together tight enough to prevent any outside ambient conditions, i.e., air-tight, from violating the airspace on the inside without creating a pressure containing part.

Figure 5:
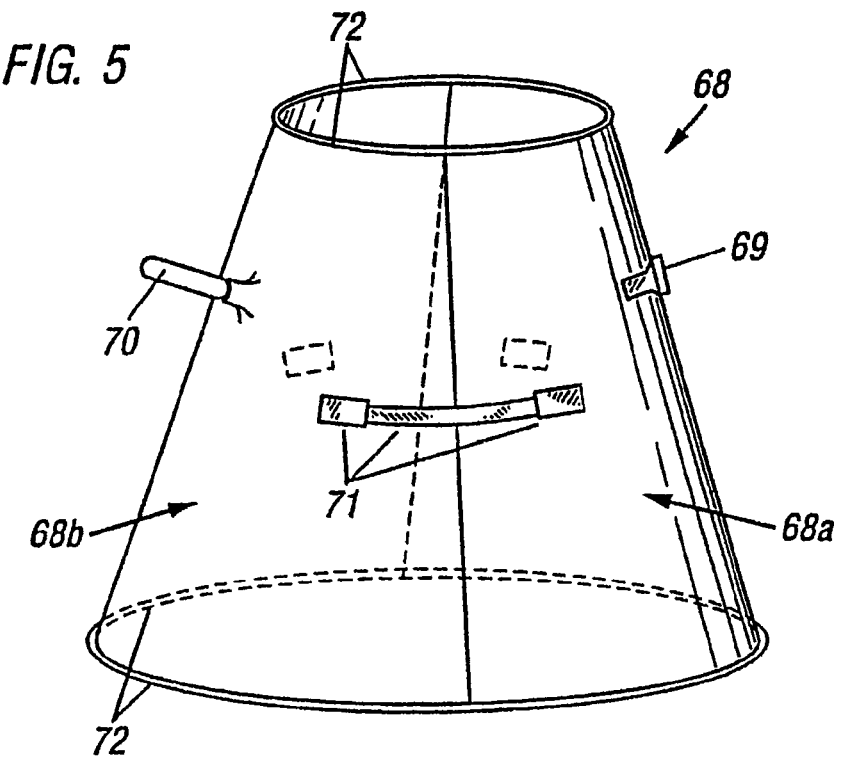
FIG. 5 is a perspective view of one embodiment of the valve stuffing box enclosure.
Figure 5A:
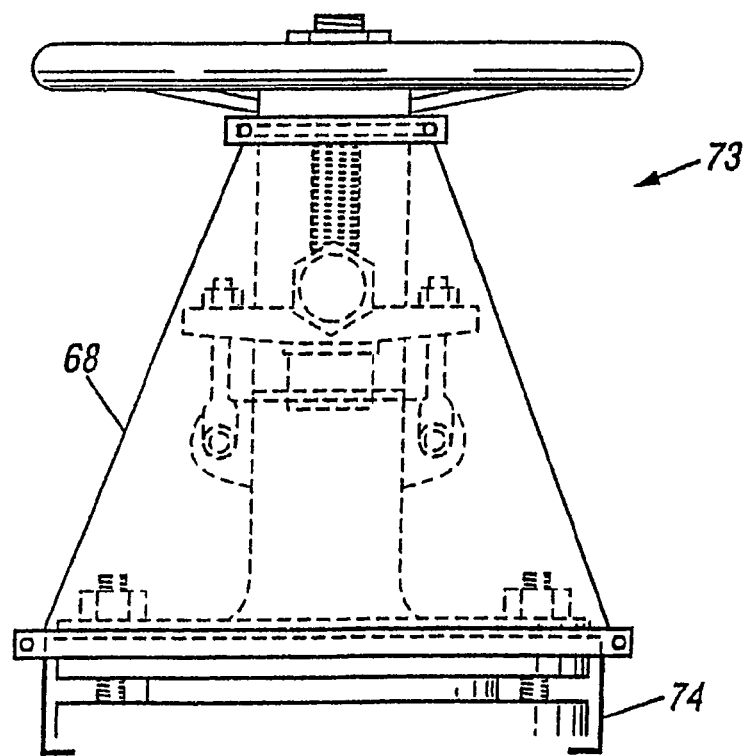
FIG. 5A is a perspective side view of a mounted valve stuffing box enclosure in conjunction with a pipe flange connection enclosure.
Figure 6:
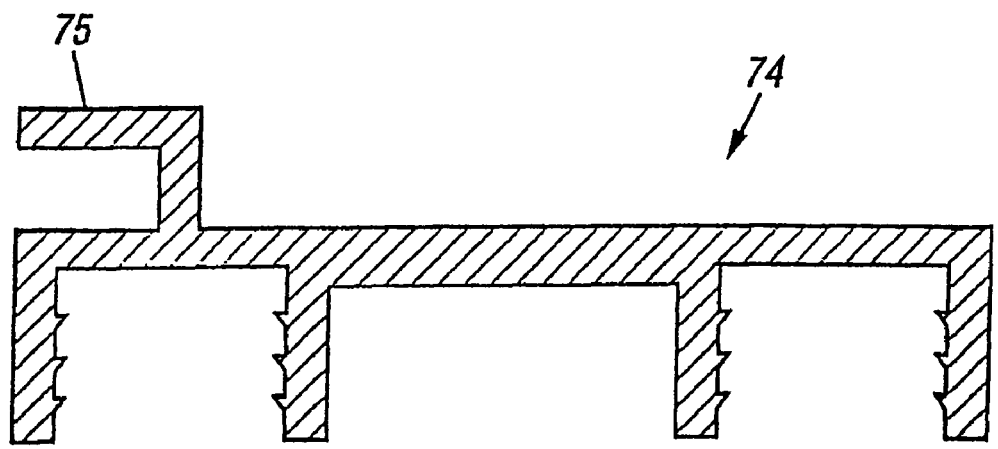
FIG. 6 is a cross-sectional view of a pipe flange connection enclosure for use in conjunction with the valve stuffing box enclosure.

The present invention includes enclosures for valve stuffing boxes. (See FIGS. 3A, 3B, 3C, 5, and 5A) Referring to FIG. 5, the valve stuffing box enclosure 68 is preferably comprised of two members (68a and 68b) or half-casings which are, preferably, when joined, shaped like a hollow frustrum, that is, the enclosure is frustro-conical in shape; however, clearly other shapes can be utilized depending on the application. (See, e.g., FIGS. 3A, 3B and 3C) Moreover, the enclosure can be constructed from more than two casings if desired. Each member may include gaskets or seals 72 around the inside top portion, that is, the narrow end of the frustrum and at the inside bottom portion, that is, the wider end of the frustrum. Each member may also include an attachment means, for example, straps and buckles 71, to secure the enclosure around the valve stuffing boxes. Any means of securing the enclosure can be used including hook and loop materials, Velcro, buckles, latches, wing-nut assemblies, bolts, adhesives, screws, etc. In addition, according to one embodiment, one member of the pair includes lengthwise channels (not shown) for receiving the other member having lengthwise gaskets or seals (not shown). The valve stuffing box enclosure is preferably used in conjunction within the pipe flange connection enclosure described above. Referring to FIGS. 5a and b, the valve stuffing box enclosure 73 of the present invention is designed to overlap and connect or engage with pipe flange enclosure 74 to form a heretofore unknown and unrealized combination for the containment and detection of emissions from valve stuffing boxes. This is accomplished by including a channel or groove 75 (shown in FIG. 6) on the pipe flange connection enclosure whereby the bottom of the valve stuffing box enclosure sealably sits and secures around the pipe flange enclosure.

The enclosure for valve stuffing boxes of the present invention may be comprised of (a) a casing assembled from two half-casings or members, shaped to be disposed around the outer configuration of a gland flange and yoke of a valve bonnet, each of the half-casings or members including a threaded coupling; (b) a resilient upper seal ring affixed around the inner edge of the upper portion of each of the half casings, designed to create a seal with the upper portion of the yoke; (c) a resilient lower seal ring affixed around the inner edge of the lower portion of each of the half-casings designed to create a seal with the lower portion of the yoke; (d) two resilient gasket seals, disposed along the length of each one of the longitudinal edges of one of the two half-casings; (e) a groove along the length of both longitudinal edges of the other of the two half-casings designed to accept a resilient gasket seal creating a seal between the two assembled half-casings; (f) four lip gasket seals, each affixed at one of the four abutting corners of one of the two half-casings, to complete a seal between the two half-casings and the yoke of the valve bonnet; (g) means for joining the two half-casings; (h) a cylindrical indicating cartridge, having one open end with outer threads, and having the opposing end sealed with a one-way venting cap, the indicating cartridge (detector/signaler) is designed to exhibit a change upon exposure to emissions from the valve bonnet, and the open end of the indicating cartridge being threadably disposed in the coupling of one of the half-casings; and (i) a plug threadably disposed in the coupling of the other of the half-casings.

Figure 5B:
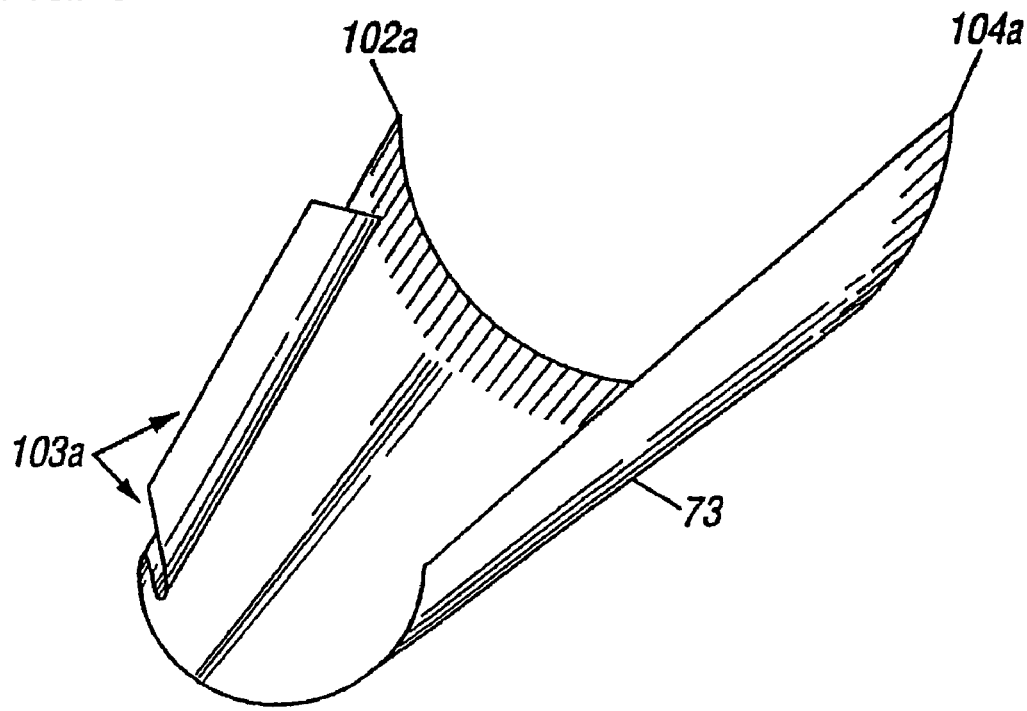
FIG. 5B is a perspective view of another embodiment of two halves of a valve stuffing box enclosure.
Figure 5B:
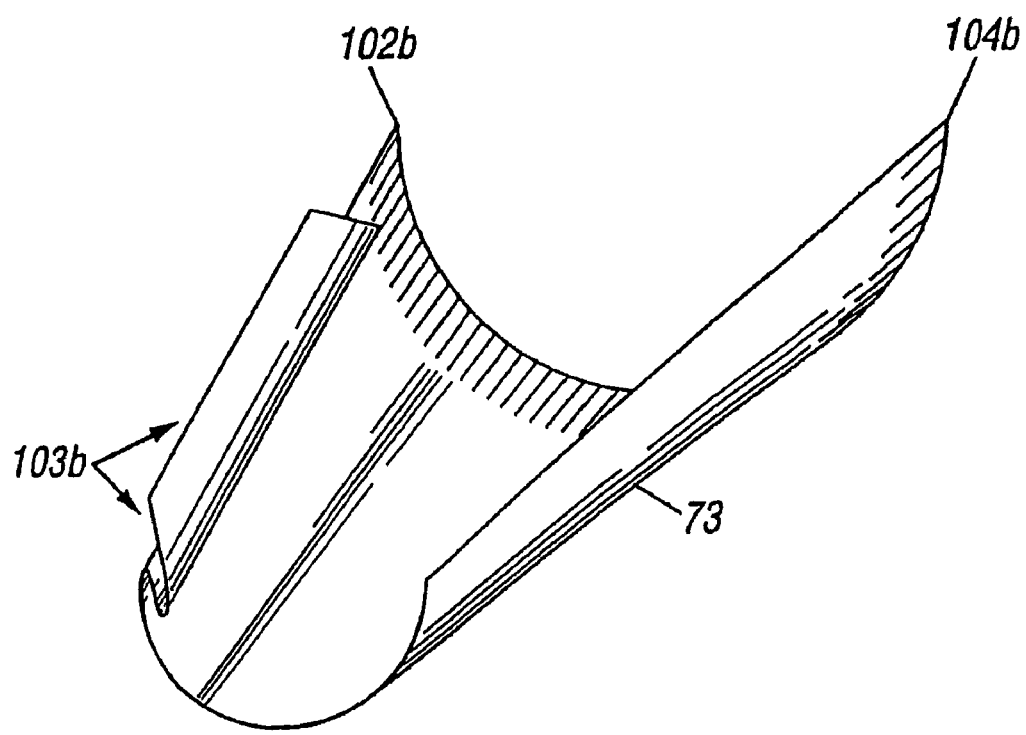
Figure 5C:
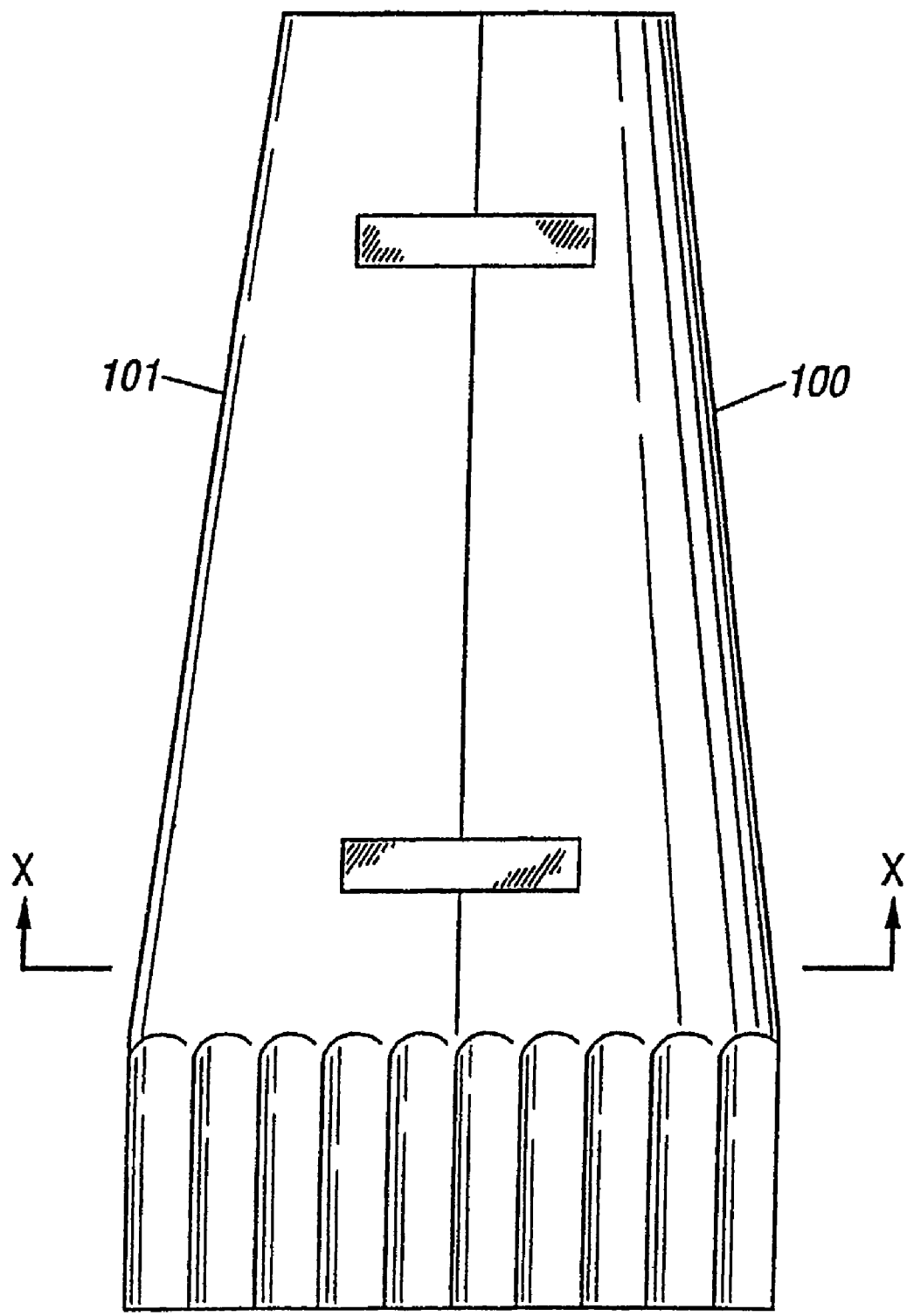
FIG. 5C is a perspective side view of an assembled valve stuffing box enclosure.
Figure 5D:
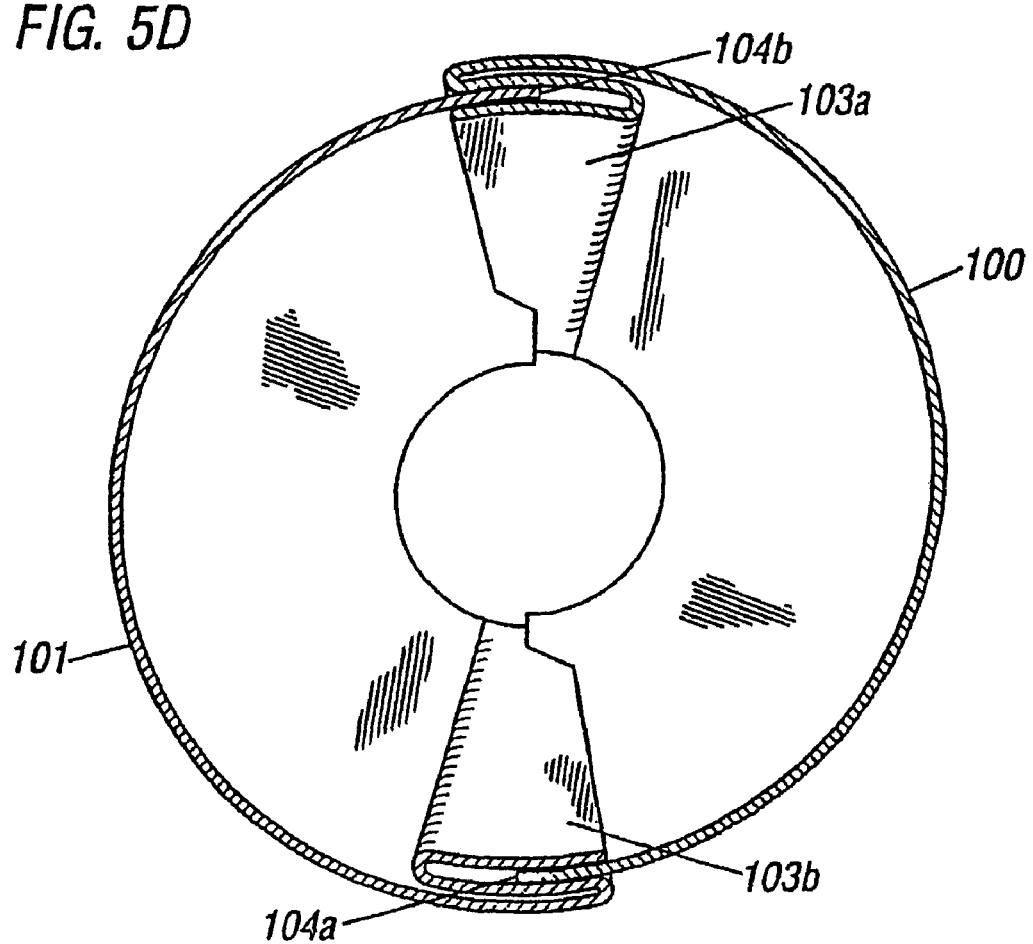
FIG. 5D is a bottom view of an assembled valve stuffing box enclosure.

FIG. 5B shows a side view of two halves or members (100, 101) of the preferred valve stuffing box enclosure. The halves or members are mirrored pairs and each includes along the inside edge of one side (102a or 102b) a receiver (103a and 103b) for receiving, when joined together, the corresponding side (104a and 104b) of the mirrored pair member to form a mechanical connection between the two halves along the vertical length of the adjoining sides. The receiver may be a pleat or fold, made integral with the particular member. The connection is preferably a metal to metal seal sufficient such that any emissions leaked into the enclosure are reliably detected by the detector. Moreover, preferably, the seal is sufficient such that the path of least resistance for an emission to pass is into the area where the detector is located. As shown in FIG. 5B, the receivers 103a and 103b are large enough or wide enough such that a connection can be made of varying degrees, i.e., the enclosures with the receivers are self-adjusting and therefore, can, be utilized with valve stuffing boxes of varying dimensions or with gaskets/seals of varying thicknesses. FIG. 5C and FIG. 5D, utilizing the same reference numbers, show members 100 and 101 joined. Preferably, the bottom portion of members 100 and 101 are corrugated.

It should also be recognized that the valve stuffing box enclosure, while being described in relation to existing valve stuffing boxes, can also be of an unitary construction and enclosed around the valve stuffing box when it is assembled or connected in the field. The basic construction of the non-unitary enclosure applies equally to the unitary construction.

The valve stuffing box enclosures are preferably made from a standard sheet of aluminum. The valve enclosures have a certain height and circumference depending on manufacture, design, and pressure class of the valve to be enclosed. After cutting the sheet material to the desired specification, the material is then rolled per the appropriate configuration. The preferred valve enclosure design requires two halves or members that attach to the yoke down to the base of the bonnet on the bolted area where the valve is joined at the body bonnet connection. On each half, according to one embodiment, there is affixed an extruded gasket comprised of a closed cell sponge or silicone material secured around the top, vertical, and bottom of the two valve enclosure half-casings. The first half-casing of the valve enclosure fits against the yoke and valve bonnet and the other half-casing accepts or fits on the outside of the other half. Each valve enclosure is affixed with simple attachment means to provide a snug fit from top, vertical, and bottom by drawing the two halves together creating a protected environment from outside ambient conditions so that pressure is not contained in the valve enclosure. Preferably, the enclosure contains a hole to accept a vent plug.

Figure 7:
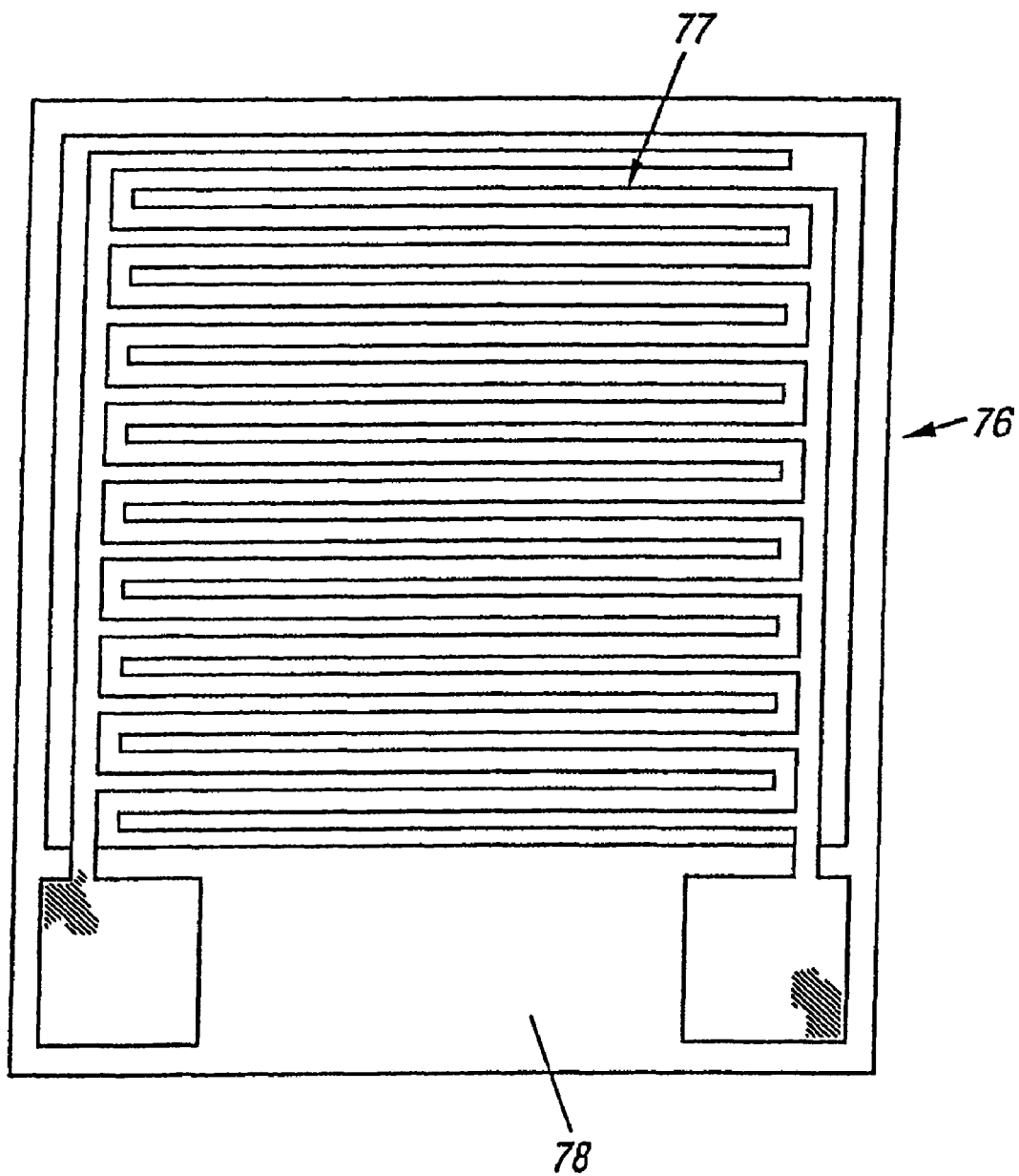
FIG. 7 is a top view of an adsorption detector without the carbon-elastomer mixture.

The detectors of the present invention are, according to one embodiment, adsorption type detectors. The detectors of the present invention may be comprised of a substrate, electrode elements, adsorbent particles, and an elastomer or binder. Additionally, the detectors may be further comprised of non adsorbent particles like metal oxides, e.g., titanium oxide. Optionally, the detectors of the present invention may include a temperature detector. In operation, a voltage is supplied across the detector which has a standard resistivity. When the detector is exposed to an emission of certain substances, the resistivity of the detector changes. Referring to FIG. 7, substrate 78 of the detector may be comprised of alumina or silica or mixtures thereof and may be approximately 0.025 inches in thickness. Electrode elements 77 are preferably in an interdigitated configuration. Electrode elements 77 may be formed of any conductive material including gold, platinum, silver, or any other chosen metals and preferably are formed by thick-film metallization. The particle component (not shown) of the adsorption detector of the present invention may be in the form of particles of substantially uniform size or may be contained in a thick-film ink. Preferably, carbon or purified carbon particles of substantially uniform size are utilized. For example, Carbone of America Series F purified uniform sized particles may be utilized in the practice of the present invention. However, in some circumstances it is preferred to utilize a mixture of carbon particles with, for example, non adsorbent particles, e.g., $SiO_2$, $Al_2O_3$, or mixtures thereof, e.g., pumice. It has been found that the addition of $SiO_2$, $Al_2O_3$, $TiO_2$ or mixtures thereof are particularly useful for increasing the heat resistance of the detector. Various elastomers or binders (not shown) may be used in the construction of the adsorption detector of the present invention; however, it has been found that gas permeable silicone-based elastomers are preferred. An example of an elastomer/binder useful in the present invention, especially in high temperature applications, includes silicone, for example, "SYLGARD" manufactured by Dow Chemical. In any event, the elastomer or binder chosen should preferably be purified so that it does not outgas at high temperatures leading to a false emission reading.

Figure 8:
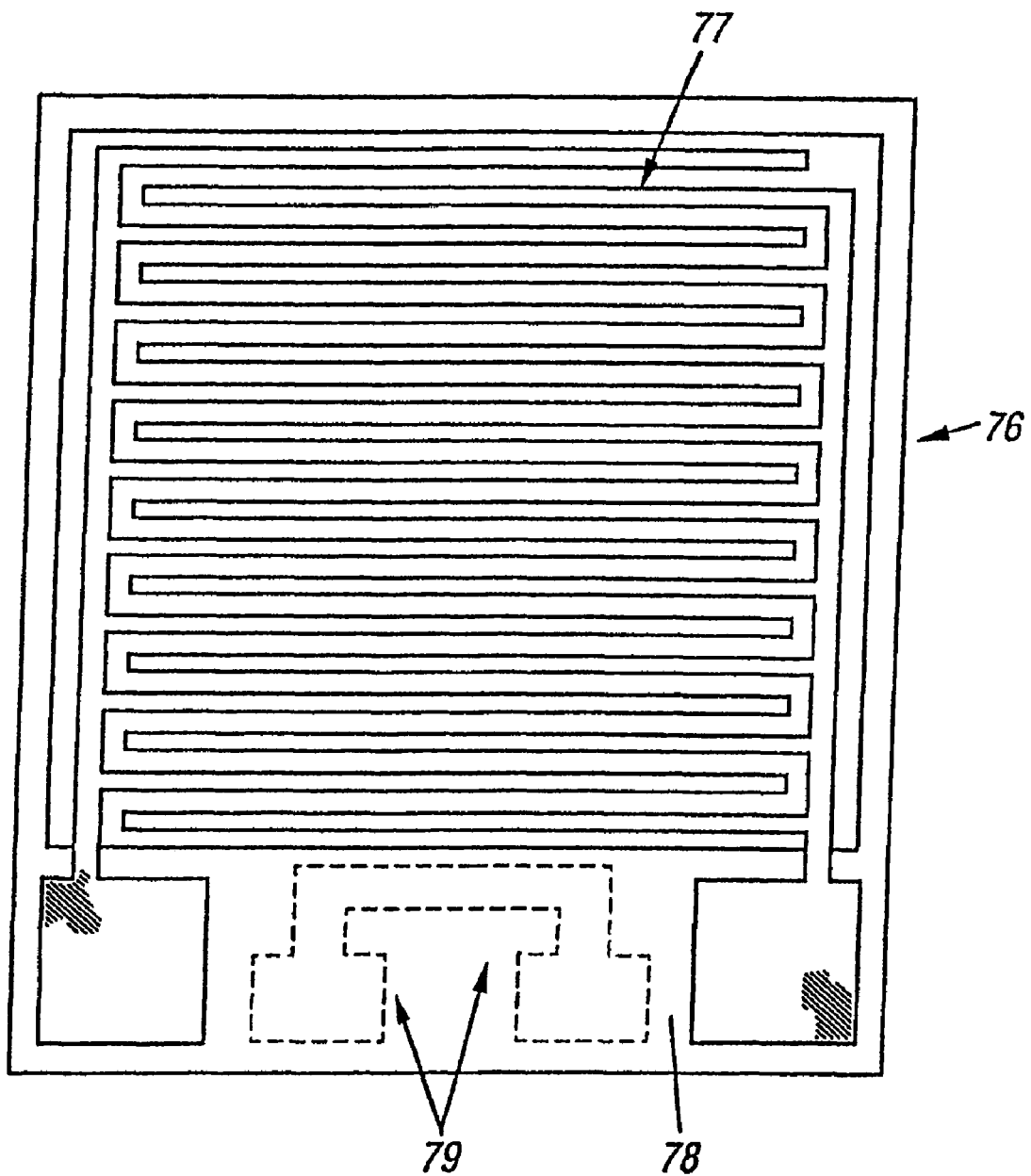
FIG. 8 is a top view of the detector substrate with electrode elements and temperature detector (particle/binder mixture not shown).

The optional temperature detector is manufactured onto the substrate, e.g., in the same manner as on the electrode elements. The temperature detector unlike the electrode elements is not covered by the elastomer/binder and may be comprised of platinum, preferably 95% pure for use in high temperature applications. FIG. 8 illustrates the temperature detector placement on the substrate (binder/elastomer and particles not shown.)

Preferably, the temperature detector is fabricated utilizing the same techniques described above for the fabrication of the electrode element of the adsorption detector. It is preferred to simply fabricate the temperature detector on the backside of the substrate on which the adsorption detector is fabricated. Referring to FIG. 8, an embodiment of the temperature detector 79 is shown on the frontside of the substrate. The material utilized to fabricate the element of the temperature detector is preferably "PTC Thermistor Composition PC 10315" available from METECH, Inc., Route 401, Elverson, Pa. 19520. This material has a viscosity of 125-225 kcps (Brookfield HBT, Spindle SC4-14, 10 rpm, 25° C.+/−1° C.). The product contains a thinner "Metech 3995" also available from the same company. The "PTC Thermistor" material has the following fired properties: resistivity$^2$ (ohms/square) of 10; tolerance of +/−10%; TCR (ppm/c)$^2$ of 3000+/−200.

The detector of the present invention may be comprised of carbon and elastomer/binder on a substrate with electrode elements or as follows: from about 35% to about 60% by weight elastomer, from about 15% to about 35% by weight adsorbent particles, and, optionally, from about 25% to about 35% by weight non adsorbent particles. Specific example formulations include: (1) 30% by weight metal oxide, 20% by weight carbon, and 50% by weight elastomer/binder; (2) 27.75% by weight metal oxide, 26% by weight carbon, and 46.25% by weight elastomer/binder; (3) 28.50% by weight metal oxide, 24.0% by weight carbon, and 47.50% by weight elastomer/binder; and (4) 27% by weight metal oxide, 28% by weight carbon, and 45% by weight elastomer/binder. Preferably, the metal oxide is titanium dioxide which can be of one uniform size, e.g., 1 micron, the carbon is purified carbon particles of substantially the same size available from Carbone of America under the tradename "UCP-1-M-Grade," e.g., 1, micron or less, and the elastomer is silicone, e.g., "SYLGUARD" available from Dow Chemical.

Generally, the adsorption detectors of the present invention can be fabricated using micro-electronic fabrication technology. Specifically, photolithographic reduction and thick-film metallization and silk-screening techniques may be used. Indeed, it is preferred that the adsorbent particles, like carbon, mixed with the elastomer are placed as a layer onto the surface of the electrode element by silk-screening. It is believed that the thickness of this layer affects the sensitivity of the detector.

In making the above described detector, the following steps are followed: (1) mix carbon and silicone to form a mixture, (2) add a metal oxide to the mixture (optional), (3) mix or blend to ensure an equal dispersion of components throughout and in the silicone material, and (4) apply the mixture to the substrate making sure the thickness is uniform. The particles may be substantially contained within the elastomer, i.e., substantially non-protruding from the surface or they may protrude from the surface depending upon the application of the detector.

The adsorption detector of the present invention, unlike prior art adsorption detectors, can detect substances having a Van der Waals' "a" constant of less than about 9 when operated in a non-current saturated mode or in a linear region using carbon or adsorbent particles of substantially uniform size. The term "current saturated mode" as used herein means that small increments in the voltage across the detection device do not show the corresponding increases in the current flowing through the device as would otherwise be predicted by Ohm's Law, but instead the current flowing through the device remains substantially constant. Another way of expressing the same, is that in a current saturated mode, voltage is applied to the detection device to a level after which the current no longer increases linearly, that is, it operates in a nonlinear region. Of course, in a non-current saturated mode, as the voltage is increased the current increases linearly or as predicted by Ohm's law, i.e., the detector is operating in a linear region.

The present inventive system may also be utilized with transmitters, in communication with a set of detectors and a set of enclosures. The transmitters send signals, e.g., to one central processing location identifying the status of a particular possible emission site. For example, each transmitter can have its own predetermined programmed identification code and an internal clock to transmit a status report on a predetermined time interval. The system can be set up that in the event a certain transmitter misses a check-in period, the system will allow for a predetermined number of missed check-in times before setting off an alarm. Any transmitter useful in the present inventive system preferably is equipped with a low battery transmission signal which notifies when the battery or power supply source must be replaced.

An example of a transmitter that may be useful in conjunction with the present invention operates with a 3.0 volt, 3.2 volt or 3.5 volt battery power supply and is a one-way R.F. transmitter, i.e., radio frequency, 900 megahertz spread spectrum system which is capable of handling up to 3000 points in a single cell site. The transmitter is in communication with the detector such that upon the detector coming into contact with an emission, the resistivity of the detector changes and the transmitter sends an alarm signal. The alarm can be audible, visual, local, and/or at a remote location.

While the preferred embodiment has been described with reference to a gas detector, other detectors may be utilized including temperature, pressure, and level detectors alone or in combination with others. In relation to the preferred embodiment utilizing a gas detector, it is especially preferred to use it in combination with a temperature detector.

While the illustrative embodiments of the invention have been described with particularity, it will be understood that various other modifications will be apparent to and can be readily made by those skilled in the art without departing from the spirit and scope of the invention. Accordingly, it is not intended that the scope of claims appended hereto be limited to the examples and description set forth herein, but rather that the claims be construed as encompassing all the features of patentable novelty which reside in the present invention, including all features which would be treated as equivalents thereof by those skilled in the art to which the invention pertains.

What is claimed is:

1. A system for enclosing materials, detecting characteristics of the enclosed materials, detecting materials escaped from enclosures, and transmitting multiple types of data relating to the enclosed and escaped materials, said system comprising:
   (a) a first set of enclosures enclosing materials having temperatures within said first set of enclosures;
   (b) a second set of enclosures enclosing materials having levels within said second set of enclosures;
   (c) a third set of enclosures enclosing materials having pressures within said third set of enclosures;
   (d) a fourth set of enclosures enclosing one or more of the first, second, and third sets of enclosures;
   (e) a first set of detectors in communication with the first set of enclosures detecting temperatures of the materials within the first set of enclosures;
   (f) a second set of detectors in communication with the second set of enclosures detecting levels of the materials within the second set of enclosures;
   (g) a third set of detectors in communication with the third set of enclosures detecting pressures within the third set of enclosures;
   (h) a fourth set of detectors in communication with the fourth set of enclosures detecting (1) temperatures outside one or more of the first, second, and third sets of enclosures within one or more enclosures of the fourth set of enclosures, and (2) material escaped from within at least one or more of the first, second, and third set of enclosures;
   (i) a first set of transmitters in communication with the first set of detectors transmitting signals relative to temperatures of material detected within the first set of enclosures;
   (j) a second set of transmitters in communication with the second set of detectors transmitting signals relative to levels of material detected within the second set of enclosures;
   (k) a third set of transmitters in communication with the third set of detectors for transmitting signals relative to pressures detected within the third set of enclosures;
   (l) a fourth set of transmitters in communication with the fourth set of detectors transmitting signals relative to (1) temperatures outside one or more of the first, second, and third sets of enclosures and within one or more enclosures of the fourth set of enclosures, and (2) material escaped from within at least one or more of the first, second, and third sets of enclosures; and
   (m) a central processing location receiving signals from the first, second, third and fourth sets of transmitters.

2. A system according to claim 1, wherein one or more of the first, second, third and fourth sets of transmitters transmit signals relative to two or more of (a) temperatures of material within the first set of enclosures, (b) levels of material within the second set of enclosures, (c) pressures within the third set of enclosures, (d) temperatures outside the first, second, or third set of enclosures, and (e) materials escaped from within the first, second, and third sets of enclosures detected within the fourth set of enclosures.

3. A system according to claim 2, wherein one or more of the transmitters from the first, second, third and fourth sets of transmitters is battery-powered.

4. A system according to claim 3, wherein one or more of the detectors from the first, second, third and fourth sets of detectors is battery-powered.

5. A system according to claim 1, further comprising at least one additional transmitter transmitting signals relative to more than one of the first, second, third and fourth sets of detectors.

6. A system according to claim 5, wherein the at least one additional transmitter is battery-powered.

7. A system according to claim 1, wherein one or more of the detectors from the first, second, third and fourth sets of detectors is battery-powered.

8. A system according to claim 1, wherein the two or more of the first, second, and third sets of enclosures are the same enclosures.

9. A system according to claim 1, wherein the first, second, and third sets of enclosures are the same enclosures.

10. A system for enclosing materials, detecting characteristics of enclosed materials, detecting materials escaped from enclosures, and transmitting multiple types of data relating to the enclosed and escaped materials, said system comprising:
   (a) a first net of enclosures enclosing materials having temperatures within said first set of enclosures;
   (b) a second set of enclosures enclosing materials having pressures within said second set of enclosures;
   (d) a third set of enclosures enclosing one or more enclosures of the first and second sets of enclosures;
   (e) one or more first detectors in communication with one or more enclosure of the first set of enclosures detecting temperature of material within one or more enclosures of the first set of enclosures;
   (f) one or more second detectors in communication with one or more enclosures of the second set of enclosures detecting pressure within one or more enclosures of the second set of enclosures;
   (g) one or more third detectors in communication with one or more enclosure of the third set of enclosures detecting (1) temperatures outside one or more enclosures of the first and second sets of enclosures and within one or more enclosures of the third set of enclosures, and (2) material escaped from within at least one or more enclosure of the first and second sets of enclosures;
   (h) one or more first transmitters in communication with one or more first detectors transmitting signals relative to temperature of material detected within one or more enclosure of the first set of enclosures;
   (i) one or more second transmitters in communication with one or more second detectors transmitting signals relative to pressures detected within one or more enclosure of the second set of enclosures;

(j) one or more third transmitters in communication with one or more third detectors transmitting signals relative to (1) temperatures outside one or more enclosure of the first and second set of enclosures and within one or more enclosures of the third set of enclosures, and (2) material escaped from within at least one or more of the first and second sets of enclosures and within one or more enclosure of the third set of enclosures; and (k) a central processing location receiving signals from one or more of the first, second, and third transmitters.

11. A system according to claim 10, wherein one or more of the first, second, and third transmitters transmit signals relative to two or more of (a) temperatures of material within one or more enclosure of the first set of enclosures, (b) pressures within one or more enclosure of the second set of enclosures, (d) temperatures outside one or more enclosures of the first and second set of enclosures, and (e) materials escaped from within one or more enclosures of the first and second sets of enclosures detected within one or more enclosures of the third set of enclosures.

12. A system according to claim 11, wherein one or more of the first, second, and third transmitters is battery-powered.

13. A system according to claim 12, wherein one or more of the first, second, and third detectors is battery-powered.

14. A system according to claim 13, further comprising at least one additional transmitter transmitting signals relative to more than one of the first, second, and third detectors.

15. A system according to claim 14, wherein the at least one additional transmitter is battery-powered.

16. A system according to claim 10, wherein one or more of the first, second, and third detectors is battery-powered.

17. A system according to claim 10, wherein the two or more of the first, second, and third enclosures are the same enclosures.

18. A system according to claim 10 wherein the first, second, and third sets of enclosures are the same enclosures.

19. A system according to claim 10, wherein one or more of the first, second, and third transmitters is battery-powered.

20. A method for enclosing materials, detecting characteristics of the enclosed materials, detecting materials escaped from enclosures, and transmitting multiple types of data relating to the enclosed and escaped enclosed materials, said method comprising:

(a) enclosing materials within a first set of enclosures, said materials having temperatures within said first set of enclosures;

(b) optionally, enclosing materials within a second set of enclosures, said materials having levels within said second set of enclosures;

(c) enclosing materials within a third set of enclosures, said materials having pressures within said third set of enclosures;

(d) enclosing one or more of the first, second, and third sets of enclosures within a fourth set of enclosures;

(e) detecting temperatures of the materials within the first set of enclosures;

(f) optionally, detecting levels of the materials within the second set of enclosures;

(g) detecting pressures within the third set of enclosures;

(h) detecting (1) temperatures outside one or more of the first, second, and third sets of enclosures within one or more enclosures of the fourth set of enclosures, and (2) material escaped from within at least one or more of the first, second, and third set of enclosures and enclosed with one or more enclosures of the fourth set of enclosures;

(i) transmitting signals relative to temperatures of material detected within some of the first set of enclosures via a first set of battery-powered transmitters in communication with the first set of detectors;

(j) optionally, transmitting signals relative to levels of material detected within some of the second set of enclosures via a second set of battery-powered transmitters in communication with the second set of detectors;

(k) transmitting signals relative to pressures detected within some of the third set of enclosures via a third set of battery-powered transmitters in communication with the third set of detectors;

(l) transmitting signals relative to (1) temperatures outside one or more of the first, second, and third sets of enclosures and within one or more enclosures of the fourth set of enclosures, and (2) material escaped from within at least one or more of the first, second, and third sets of enclosures and enclosed within one or more enclosures of the of the fourth set of enclosures via a fourth set of battery-powered transmitters in communication with the fourth set of detectors; and (m) receiving signals from the first, third and fourth sets of transmitters at a central processing location.

21. A method according to claim 20, wherein one or more of the first, second, third, and fourth sets of detectors are battery-powered.

22. A method according to claim 20, wherein two or more of the first, second and third sets of enclosures are the same enclosures.

23. A method according to claim 20, wherein the signal transmitting steps are radio frequency transmissions.

* * * * *